United States Patent
Shattuck et al.

[19]

[11] Patent Number: 5,902,022
[45] Date of Patent: *May 11, 1999

[54] CONTROLLED CONTACT STRESS ROLLER BEARING

[75] Inventors: Charles W Shattuck, Goshen; Mark A Polinsky, Torrington, both of Conn.; David Gurka, Sylvania, Ga.

[73] Assignee: The Torrington Company, Torrington, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/671,834

[22] Filed: Jun. 28, 1996

[51] Int. Cl.$^6$ ....................................... F16C 33/58
[52] U.S. Cl. ............................................. 308/569
[58] Field of Search ................................. 384/569, 571, 384/565, 558, 570

[56] References Cited

U.S. PATENT DOCUMENTS

| | | |
|---|---|---|
| 1,520,053 | 12/1924 | Drotschmann . |
| 2,259,325 | 10/1941 | Robinson . |
| 2,703,264 | 3/1955 | Pitner . |
| 3,307,891 | 3/1967 | Carulla . |
| 5,211,486 | 5/1993 | Aqvist . |
| 5,313,916 | 5/1994 | Murphy . |

*Primary Examiner*—Lenard A. Footland
*Attorney, Agent, or Firm*—John C. Bigler

[57] ABSTRACT

Rollers having a cylindrical configuration without substantial end relief are positioned between and exert a force against an outer raceway contact area and a cylindrical inner raceway contact area. The outer raceway has a crowned configuration such that a calculated maximum contact stress over the outer raceway contact area is controlled with respect to the maximum contact stress over the inner raceway contact area in order to make the outer raceway life substantially equal to the inner raceway life.

8 Claims, 3 Drawing Sheets

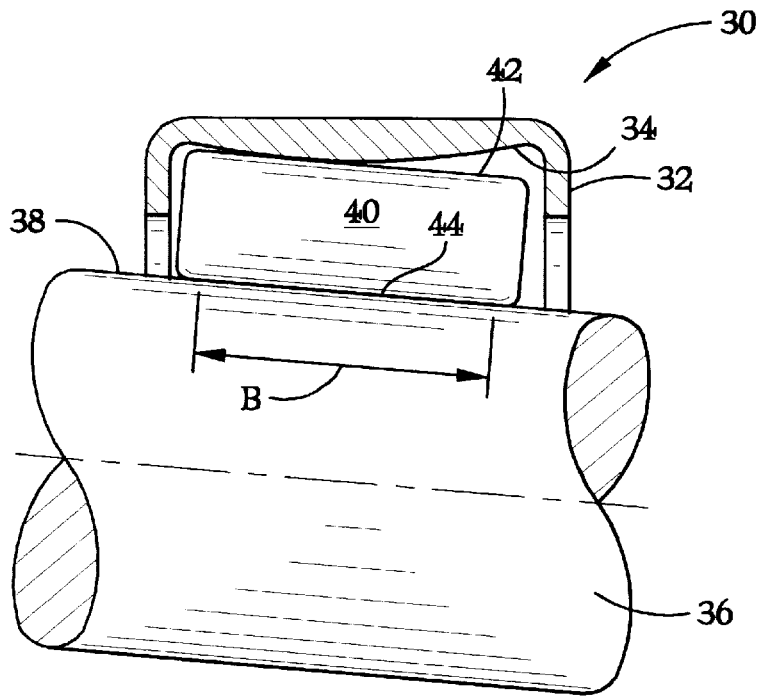
FIG. 6
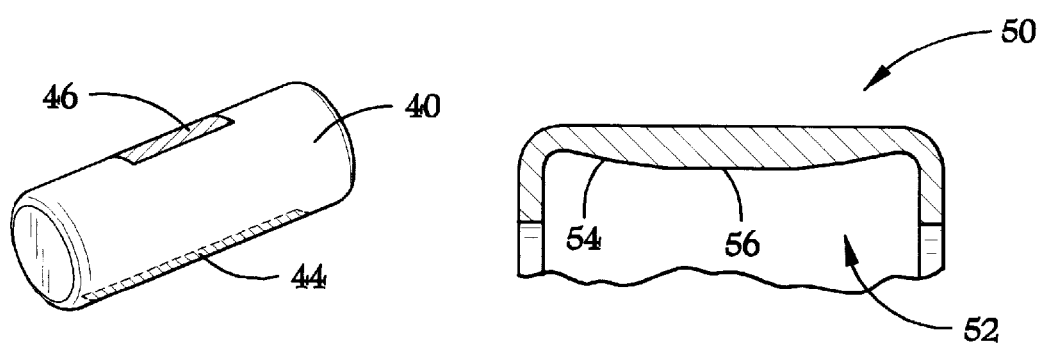
FIG. 7  FIG. 8

CONTROLLED CONTACT STRESS ROLLER BEARING

BACKGROUND OF THE INVENTION

This invention relates generally to roller bearings and, more particularly, to a roller bearing with modified geometry to control contact stress and extend bearing life.

In conventional roller bearings, the rollers typically have relieved ends to allow for misalignment or slope of the outer ring with respect to the shaft. The relieved ends adequately accommodate the misalignment without excessive end loading, but the end relief on the rollers shortens their contact length and raises the contact stress on the outer ring and shaft. Contact stress is higher on the shaft than on the outer race because the contact area is narrower on the shaft than the contact area on the outer race. As a result of this higher contact stress, fatigue failure of the shaft is the principal mode of failure of such bearings.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a controlled stress roller bearing. A rigid outer ring provides an outer raceway including an outer raceway contact area, and a shaft provides a cylindrical inner raceway including an inner raceway contact area. Rollers having a cylindrical configuration without substantial end relief are positioned between and exert a force against the outer raceway contact area and the inner raceway contact area resulting in an outer raceway maximum contact stress and an inner raceway maximum contact stress that determine respective outer raceway fatigue life and inner raceway life. The outer raceway has a crowned configuration limiting the outer raceway contact area such that the outer raceway life is substantially equal to the inner raceway life.

In another aspect of the invention, this is accomplished by providing a method for designing a roller bearing for use with a cylindrical inner raceway.

The foregoing and other aspects will become apparent from the following detailed description of the invention when considered in conjunction with the accompanying drawing figures.

BRIEF DESCRIPTION OF THE DRAWING FIGURES

FIG. 6 is a cross-sectional view of the roller bearing of FIG. 5 subjected to misalignment, with-slope and crowned configuration exaggerated;

FIG. 7 is a pictorial view of the roller of FIG. 5 with shading added to indicate the contact areas; and FIG. 8 is a cross-sectional view of a variation of the outer ring of the roller bearing of FIG. 5.

DETAILED DESCRIPTION

Figure 1:
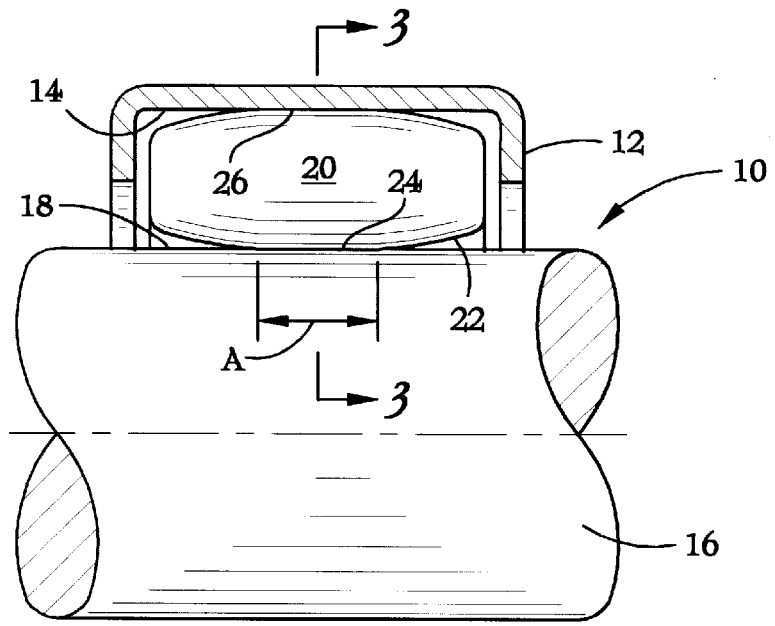
FIG. 1 is a cross-sectional view of a conventional roller bearing according to the prior art, with roller relief exaggerated.
Figure 2:
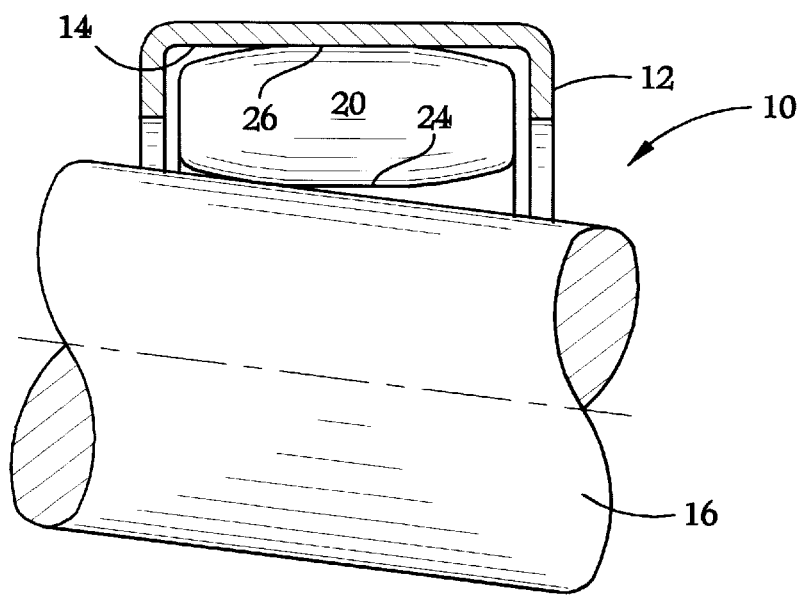
FIG. 2 is a cross-sectional view of the roller bearing of FIG. 1 subjected to misalignment, with slope and roller relief exaggerated.

Referring now to the drawings, FIG. 1 illustrates a conventional roller bearing 10 having cup or outer ring 12 with straight outer raceway 14, shaft 16 with straight inner raceway 18, and rollers 20 with relieved end portions 22. As illustrated in FIG. 2, relieved end portions 22 are configured to accommodate misalignment or slope of rollers 20, where slope is defined as the angle between outer raceway 14 and inner raceway 18.

Figure 3:
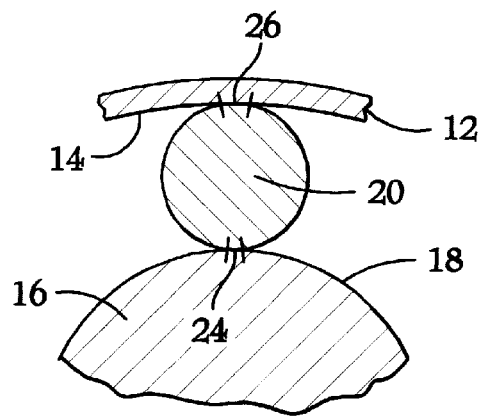
FIG. 3 is a sectional view of the roller bearing of FIG. 1 as indicated by the line 3—3.
Figure 4:
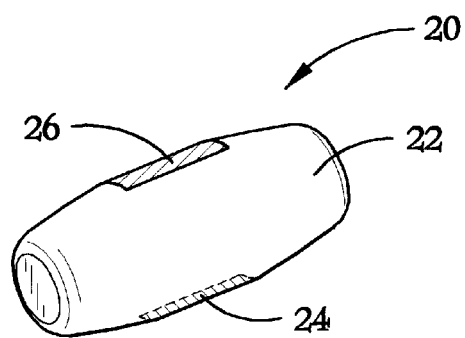
FIG. 4 is a pictorial view of the roller of FIG. 1 with shading added to indicate the contact areas.

Typically, a complex mathematical analysis is used to determine the maximum length of a cylindrical center portion of the roller and to determine the amount of radius required to provide end relief to avoid high end stresses at maximum slope. However, as shown in FIG. 3, the area of contact between rollers 20 and shaft 16 is narrower (non-conformal contact) than the area of contact between rollers 20 and outer ring 12 (conformal contact). FIG. 4 illustrates inner raceway contact area 24 (having length A in FIG. 1) and outer raceway contact area 26 as shaded areas.

Figure 5:
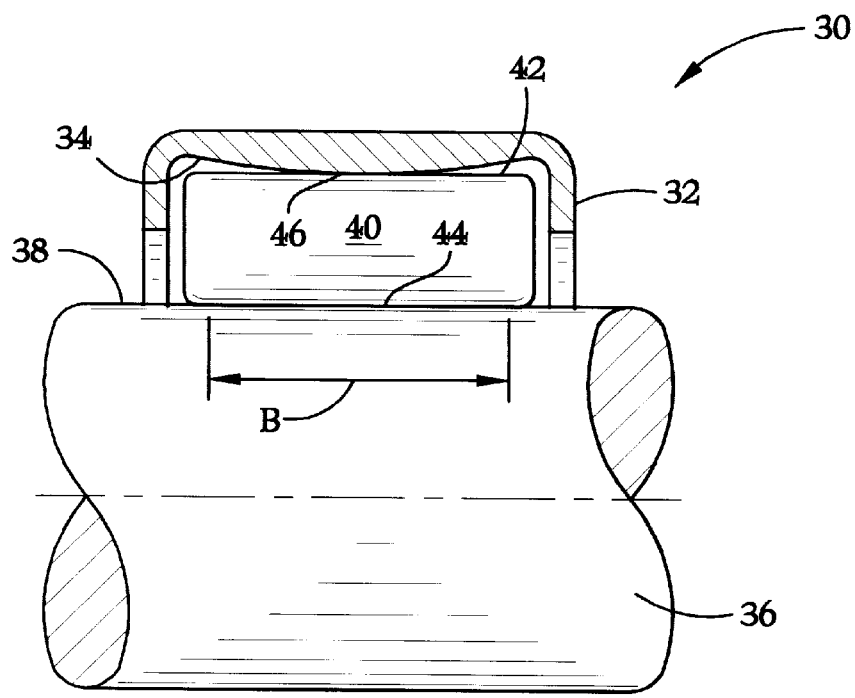
FIG. 5 is a cross-sectional view of the roller bearing of the present invention, with crowned configuration exaggerated.

In contrast to the conventional roller bearing just described, the present invention uses modified internal geometry to reduce contact stress on the shaft to a level which is equal to, or less than, the contact stress on the outer ring. As illustrated in FIG. 5, roller bearing 30 comprises cup or outer ring 32 with crowned outer raceway 34, shaft 36 with straight inner raceway 38, and rollers 40 with fundamentally cylindrical side portions 42. The term crowned is used to indicate that outer raceway 34 is curved such that a convex surface faces rollers 40.

Significantly, rollers 40 have little end relief compared to conventional rollers 20. Rollers 40 are cylindrical for as much of their length as possible without creating excess contact stress at their ends. Although rollers 40 have a corner radius and a small amount of end curvature to provide end relief, at least 80 percent of their length is cylindrical. In contrast, conventional rollers 20 have a cylindrical length of around 50 percent (or less) of their length. The amount of end relief of rollers 40, measured as a reduced radius (drop) near an end of a roller, is typically less than 5 percent of that of conventional rollers.

As illustrated in FIG. 6, crowned raceway 34 is configured to accommodate misalignment or slope of rollers 40, even though rollers 40 have cylindrical side portions 42 with little end relief. The exaggerated drawing shows dramatically that contact area 44 (having contact length B) between shaft 36 and rollers 40 is maintained along almost the full length of rollers 40, even with a steep slope angle. Crowned raceway 34 has a convex curvature that may be circular, ellipsoid, hyperbolic or otherwise curved in cross-section to facilitate pivoting of rollers 40.

FIG. 7 shows contact areas 44 and 46 pictorially and dramatizes the increased length B of contact area 44 of the present invention in comparison with length A of contact area 24 of the conventional roller bearing of FIG. 1. As a result, contact area 44 is increased and the contact stress on shaft 36 is considerably less than that on shaft 16 of the conventional roller bearing of FIG. 1. By reducing contact stress on the shaft, shaft life is significantly increased.

FIG. 8 illustrates outer ring 50 with crowned raceway 52 similar to crowned raceway 34 for use with the present invention. Crowned raceway 52 includes convex end portions 54 that may be circular or otherwise curved in cross-section to facilitate pivoting of rollers 40 but includes a cylindrical center portion 56 and transition portions therebetween. This type of crowned raceway may be used to increase the contact area and reduce the contact stress at the outer raceway when the roller bearing is operated at minimal slope.

In comparison testing of one particular size and configuration of such bearings, maximum contact stress over the outer raceway contact area and maximum contact stress over the inner raceway contact area were calculated as follows:

|  | Conventional Bearing | Controlled Stress Bearing |
|---|---|---|
| Outer Raceway | 435,000 psi (moderate stress) | 445,000 psi (moderate stress) |
| Inner Raceway | 514,000 psi (high stress) | 293,000 psi (low stress) |

Even a small reduction in contact stress on the shaft would be significant since there exists an exponential relationship between contact stress on a raceway and raceway life. In the example described above, calculated shaft stress dropped from 118 percent of outer race stress to about 66 percent, using the present invention. Accordingly, this reduction has been found to result in more than a doubling of test life. In the technology of bearing design, this is a very significant improvement.

The present invention includes a method of determining an outer raceway contour suitable for a designated maximum slope using such cylindrical rollers. Finite difference analysis considering the deflection of rollers and raceways and applying Hertz equations is used in a manner similar to that described by M. J. Hartnett of The Torrington Company in "The Analysis of Contact Stresses in Rolling Element Bearings", Journal of Lubrication Technology, Vol. 101, January 1979. An iterative process is used to determine a cup contour to maximize cylindrical length and have no end stress at the designated maximum slope.

In designing the roller bearing of the present invention, a cylindrical inner raceway is specified and the required maximum slope is determined for a particular bearing application. A roller configuration with cylindrical side portions and without substantial end relief is selected. And, a crowned configuration for an outer raceway is mathematically computed such that a maximum contact stress on the inner raceway is no greater than a calculated maximum contact stress on the outer raceway.

The advantages of the present invention are particularly significant in applications where the inner raceway is of a poorer quality material and surface preparation than that of the outer raceway. The outer raceway may be, for example, of a bearing quality steel, heat treated and ground to a smooth finish without significant imperfections. In contrast, the inner raceway may be, for example, a portion of standard shafting material made to lower standards of material, heat treatment and surface finish. The fatigue limits of such dissimilar raceways are substantially different.

In such applications where the fatigue limit of the inner raceway is substantially lower than that of the outer raceway, the present invention may be used to reduce the maximum contact stress on the inner raceway to a level well below that of the maximum contact stress on the outer raceway. As a result, premature shaft failure can be avoided; that is, the life of the inner raceway may be matched to the life of the outer ring and rollers, thereby increasing the life of the roller bearing.

The present invention may be used in a wide range of applications, including automotive wheel bearings and bearings requiring a high-slope capability, to increase the life of the roller bearings. The bearings may use a cage, retainer or full complement of rollers. The outer ring may be formed as a drawn cup or may be machined and ground from a solid piece of stock to obtain the predetermined contour to control the relative contact stresses on the outer ring and shaft.

From the above description, it should be apparent that the present invention provides a roller bearing that accommodates a high-slope misalignment of rollers with relatively low contact stress on the shaft. As a result, the life of the roller bearing is substantially increased, even when the material and surface quality of the inner raceway is inferior to that of the outer raceway.

Having described the invention, what is claimed is:

1. A controlled stress roller bearing comprising:
   an outer raceway including an outer raceway contact area;
   a cylindrical inner raceway including an inner raceway contact area; and
   rollers having a cylindrical configuration without substantial end relief, the rollers being positioned between the outer and inner raceways, applying a contact force distributed over the outer raceway and inner raceway contact areas, resulting in an outer raceway maximum contact stress and an inner raceway maximum contact stress that determine respective outer raceway life and inner raceway life;
   the outer raceway having a crowned configuration limiting the outer raceway contact area such that the outer raceway life is substantially equal to the inner raceway life.

2. The controlled stress roller bearing according to claim 1, wherein the crowned configuration of the outer raceway has a contour configured to accommodate slope of the inner raceway with respect to the outer raceway without resulting in a significant increase in the maximum contact stress against the outer raceway contact area and the inner raceway contact area.

3. The controlled stress roller bearing according to claim 1, wherein the crowned configuration of the outer raceway includes a curved portion having a circular cross section such that a convex surface is presented to the rollers.

4. The controlled stress roller bearing according to claim 1, wherein the rollers have an axial length and at least 80 percent of their axial length is cylindrical.

5. The controlled stress roller bearing according to claim 1, wherein the outer raceway and the inner raceway have similar fatigue resistance and wherein the outer raceway maximum contact stress is substantially the same as the inner raceway maximum contact stress.

6. A controlled stress roller bearing comprising:
   an outer raceway including an outer raceway contact area;
   a cylindrical inner raceway including an inner raceway contact area; and
   rollers having a cylindrical configuration without substantial end relief, the rollers being positioned between the outer and inner raceways, applying a contact force distributed over the outer raceway and inner raceway contact areas, resulting in an outer raceway maximum contact stress and an inner raceway maximum contact stress that determine respective outer raceway life and inner raceway life;

the outer raceway having a crowned configuration limiting the outer raceway contact area such that the outer raceway life is substantially equal to the inner raceway life, wherein the outer raceway is made of a first material and the inner raceway is made of a second material with less fatigue resistance than the first material and wherein the outer raceway maximum contact stress is greater than the inner raceway maximum contact stress.

7. The controlled stress roller bearing according to claim 1, wherein the rollers have a length and a cylindrical center portion of at least 80 percent of said length.

8. The controlled stress roller bearing according to claim 1, wherein the crowned configuration of the outer raceway includes curved end portions such that a convex surface is presented to the rollers and a cylindrical center portion.

* * * * *